Oct. 23, 1923.
J. S. ODOM
1,471,703
AUTOMOBILE BED
Filed Nov. 28, 1922
3 Sheets-Sheet 1
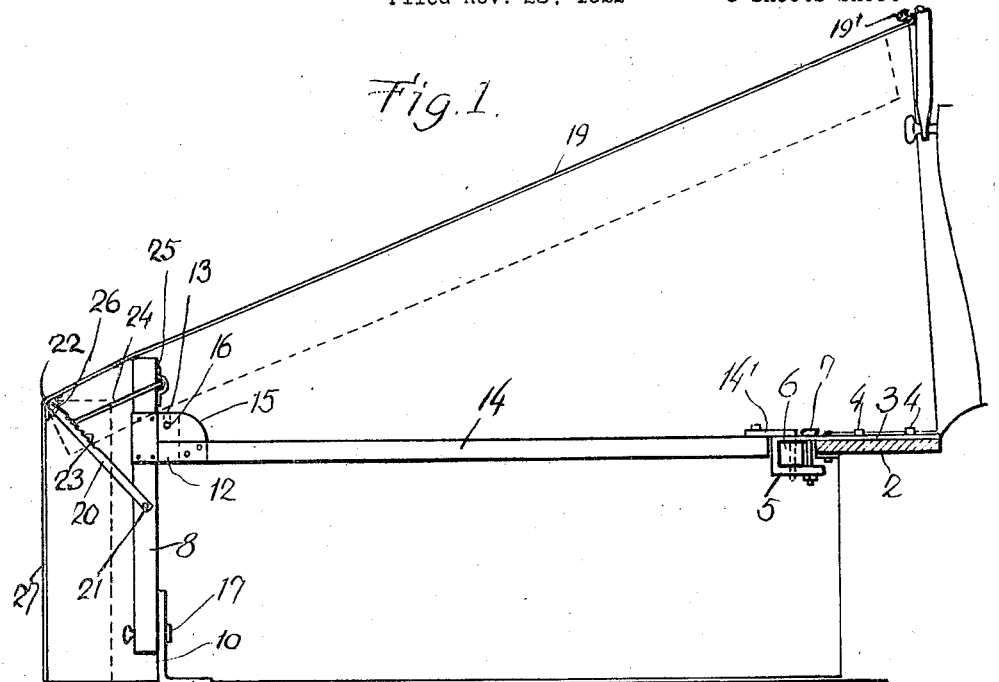
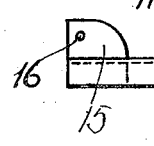
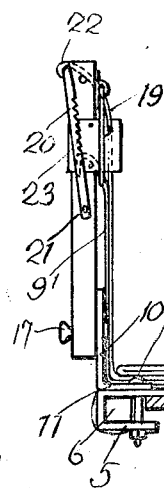
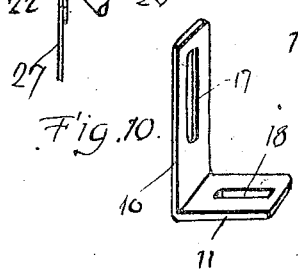
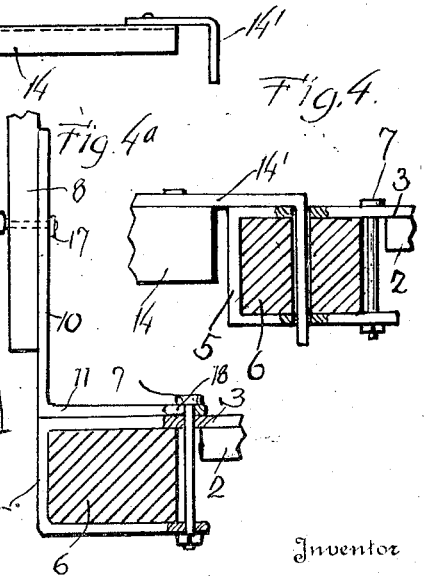
Inventor
John S. Odom
By E. W. Anderson
Attorney Oct. 23, 1923.
J. S. ODOM
1,471,703
AUTOMOBILE BED
Filed Nov. 28, 1922
3 Sheets-Sheet 2
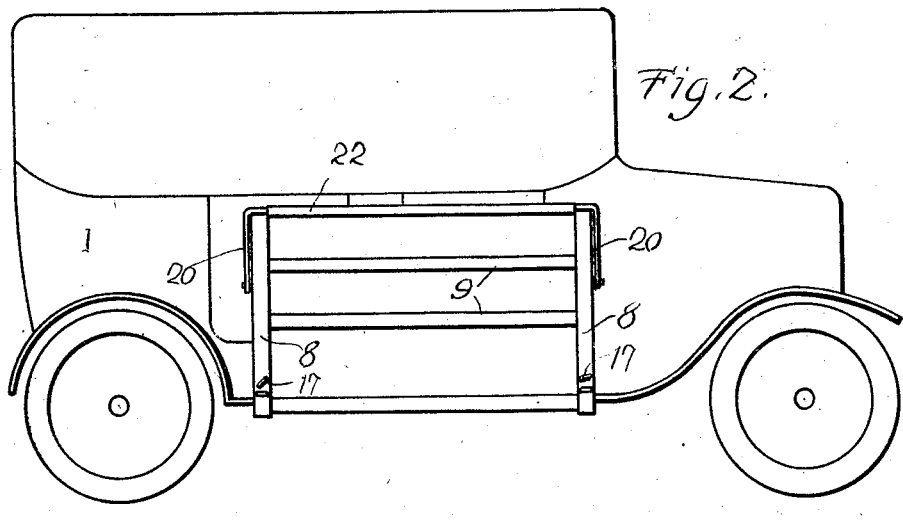
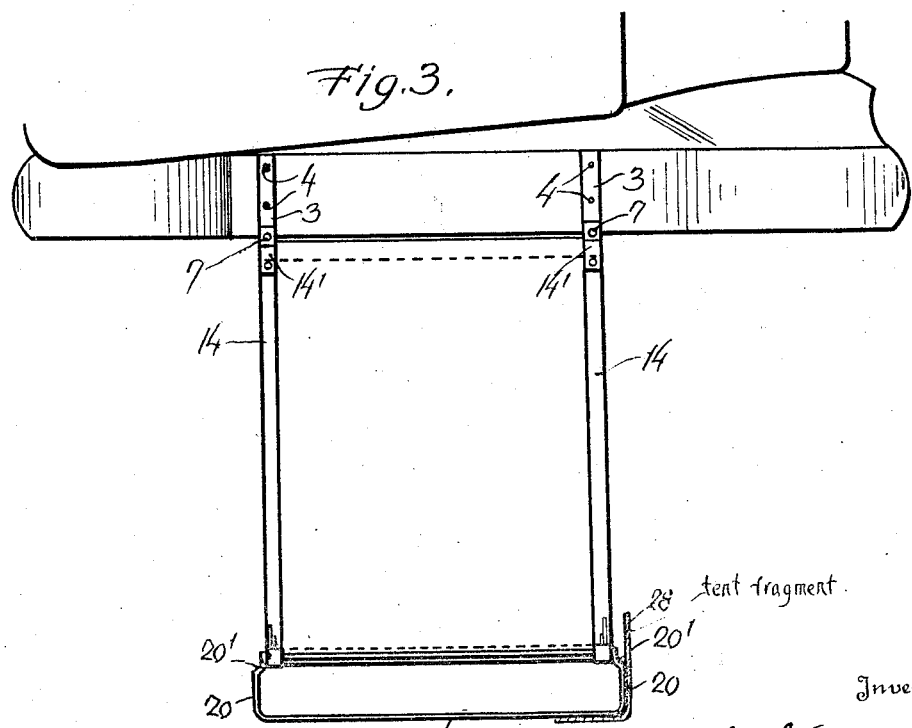
Inventor
John S. Odom.
E. W. Anderson Son.
By
Attorney Oct. 23, 1923.
J. S. ODOM
1,471,703
AUTOMOBILE BED
Filed Nov. 28, 1922
3 Sheets-Sheet 3
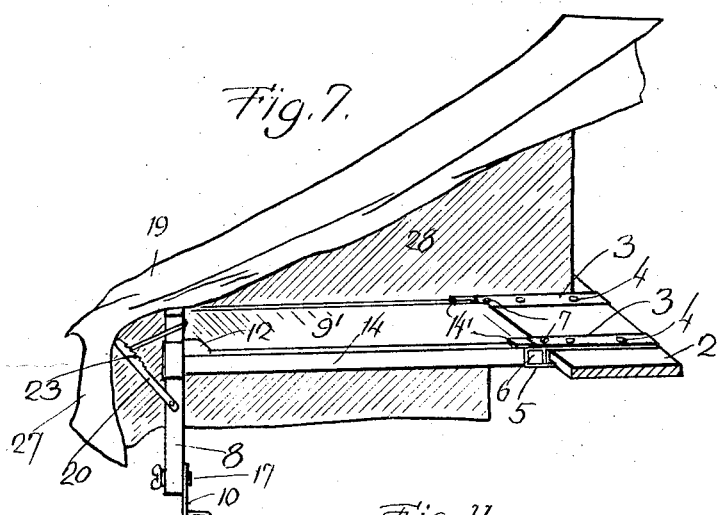
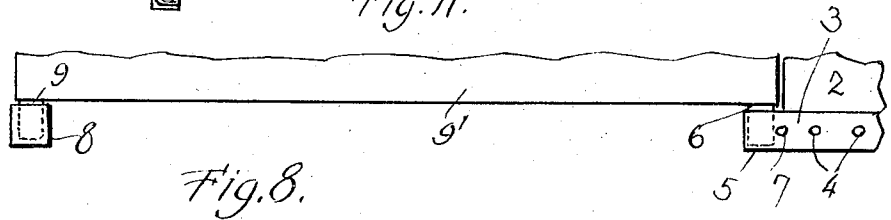
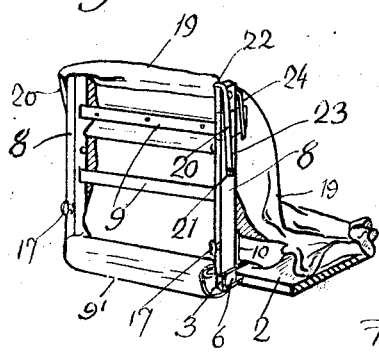
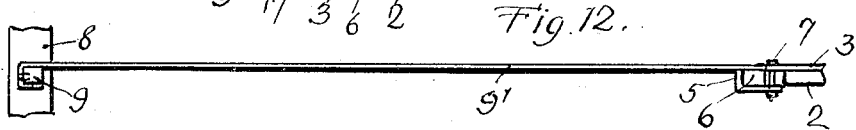

Patented Oct. 23, 1923.

1,471,703

UNITED STATES PATENT OFFICE.

JOHN S. ODOM, OF HIAWATHA, KANSAS.

AUTOMOBILE BED.

Application filed November 28, 1922. Serial No. 603,781.

*To all whom it may concern:*

Be it known that I, JOHN S. ODOM, a citizen of the United States, resident of Hiawatha, in the county of Brown and State of Kansas, have made a certain new and useful Invention in Automobile Beds; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a side view of the invention, as applied, with the tent in section.

Figure 2 is an end view of the invention, in use as a luggage carrier.

Figure 3 is a plan view of the invention in use as a bed.

Figure 4 is a detail sectional view showing the engagement of the side rail of the bed with the head bar thereof.

Figure 4ª is a similar view, showing the leg strap extension engaged with the running board bolts, the invention being then in use as a luggage carrier.

Figure 5 is a side view of the invention, in use as a luggage carrier.

Figure 6 is a detail side view of one of the side rails of the bed.

Figure 7 is a perspective view of the invention in use as a bed, with the canvas tent opened at one side.

Figure 8 is a similar view of the invention in use as a luggage carrier.

Figure 9 is a detail sectional view showing the permanent connection of the tent canvas with the inclined foot brace.

Figure 10 is a detail perspective view of one of the leg strap extensions.

Figure 11 is a detail fragmentary plan view of the bed bottom canvas, and showing its head and foot bars and their seat engagement.

Figure 12 is a detail fragmentary side view of the same.

The invention relates to an attachment for automobiles comprising a bed and tent for camping purposes, having for an object improved means for the purpose of simple and convenient nature.

The invention consists in the novel construction and combinations of parts, as hereinafter set forth.

In the accompanying drawings illustrating the invention, the numeral 1 designates the automobile, 2 the running board at one side thereof, carrying the transverse straps 3, bolted thereto at 4, said straps at their outer ends being looped at 5 around a transverse head bar 6 of the bed, a bolt 7 connecting the branches of the looped outer end of each strap serving to clamp the head bar in place.

The foot of the bed consists of two legs 8, having transverse connecting bar or bars 9, each leg having at its lower end a strap extension 10, inturned at 11 horizontally; and at its upper portion provided with an inward extending bracket 12, having an open top slot seat 13.

Two side rails 14 complete the bed proper, each side rail having at its foot end a bracket 15 provided with a lateral pin 16 engaging the seat 13 of the related bracket 12, said pin being suitably headed to insure against movement of the side rail inwardly from its said seat.

The strap extension 10 of each leg 8, has a slot and bolt connection 17 with the leg proper, whereby either leg 8 is made adjustable for height to accord with the ground level and insure that each side rail 14 shall be horizontal.

In breaking camp, the side rails are detached from their connections with the running board and with the foot legs 8, the latter being then secured to the running board by engaging the bolts 7 of the running board straps with slots 18 of the inturned ends of the straps 10 of said legs, as shown in Figures 4ª and 5, the result being that said legs with their transverse connections 9, form a convenient luggage carrier combined with said running board, wherein may be placed the tent, the side rails 14, etc.

The tent 19 is detachably buttoned at its top at 19', along the side or top of the car, the slanting top or roof of the tent passing downwardly over the foot legs 8 and being stretched taut and so held by inclined braces 20, pivoted to the legs at 21 and at their upper ends having a transverse rod connection 22, each brace having ratchet teeth or rack teeth 23 engageable by a pawl 24, pivoted to each leg at 25, the outer portion or the top or roof of the tent canvas being permanently connected to the outer ends of said braces at 26, and serving to prevent said braces from falling through force of gravity. The inclined braces 20 and the pawls 24 serve to uphold the roof or top of the tent away from the tops of the legs 8 and to space the foot 27 of the tent away from said legs, the object being to avoid leakage of water which always follows when a part of the tent, particularly the top thereof, touches or remains in contact with anything solid within the tent. These inclined braces 20 are extended outwardly at 20', as shown in Figure 3 whereby the sides 28 of the tent are held away from the sides of the legs 8 for the same reason.

In breaking camp, the tent top is unbuttoned at 19' from the car and folded within the aforesaid luggage carrier, the foot and sides of the tent being also suitably disposed within said carrier.

In camping or setting up the bed and tent, it is only necessary to unfold the tent from the luggage carrier disconnect the foot legs from the bolts 7, place the side rails of the bed in place in their seats at the head and foot of the bed, button the top of the tent to the car at 19', and stretch said top of the tent taut by the inclined braces 20 and their pawls 24, the foot leg extensions 10 being suitably adjusted for height to level the bed in accord with the nature of the ground.

The side rails 14 of the bed have each at the head end thereof a strap 14' having a downturned vertical portion detachably engaging a vertical perforation of the loop end 5 of the related strap 3, and of the head bar 6. The bed bottom canvas 9' is secured to the upper of the bars 9 of the foot of the bed and to the head bar 6 of the bed, said bar 9 being endwise removable from its seat in the legs 8, and the head bar 6 being similarly removable from its seat in the loops of the straps 3 of the running board. The bed bottom canvas is capable of being tightened by removing the head bar 6 or the said bar 9, wrapping the excess material around the bar 6 or 9, and reinserting the bar in its seat.

I claim:—

1. A knock down bed attachment for automobiles comprising straps adapted to be secured to the running board of a car and provided with outer looped ends and vertical clamp bolts engaging the branches of said looped ends, a transverse head piece adapted to be engaged with said looped ends and clamped therein by said bolts, a foot having inward extending brackets provided with open top slot seats, and lower vertically adjustable extensions, side rails having detachable connection with said head piece and lateral pins detachably engaging the seats of said brackets, the lower extensions of said foot having inturned ends adapted when the bed is knocked down for connection with said clamp bolts to form with the running board of the car a luggage carrier.

2. A knock down bed attachment for automobiles consisting of a transverse head piece adapted to be connected with the running board of the car, a foot and side rails, the latter having detachable connection with said head piece and with said foot, the foot of the bed having lower inturned ends adapted when the bed is knocked down for connection with said running board to form therewith a luggage carrier, the foot of the bed having inclined braces provided with rack teeth and pawls engaging said teeth, and a tent the top of which is adapted to be stretched taut by said braces and pawls, and having permanent connection with the outer ends of said braces.

In testimony whereof I affix my signature in presence of two witnesses.

JOHN S. ODOM.

Witnesses:
DAN WILSON,
REX ETNYRE.